US005872845A

United States Patent [19]
Feder

[11] Patent Number: 5,872,845
[45] Date of Patent: Feb. 16, 1999

[54] METHOD AND APPARATUS FOR INTERFACING FAX MACHINES TO DIGITAL COMMUNICATION NETWORKS

[76] Inventor: Benjamin Feder, 105 Hudson St., #6S, New York, N.Y. 10013

[21] Appl. No.: 690,714

[22] Filed: Jul. 31, 1996

Related U.S. Application Data

[60] Provisional application No. 60/019,380, Jun. 5, 1996.

[51] Int. Cl.[6] .............................. H04L 9/00; H04N 1/00
[52] U.S. Cl. ................................. 380/18; 380/49; 380/59; 379/100.1; 379/100.12; 379/100.13; 358/400; 358/443; 358/445
[58] Field of Search ..................... 380/9, 10, 18, 380/20, 49, 50, 59; 379/100, 100.01, 100.09, 100.12, 100.13; 375/211, 214; 358/400, 407, 425, 426, 442, 443, 445, 448, 462, 467, 468, 469

[56] References Cited

U.S. PATENT DOCUMENTS

| | | | |
|---|---|---|---|
| 2,870,246 | 1/1959 | Hallden et al. .................... | 358/407 |
| 3,553,367 | 1/1971 | Krauss et al. ...................... | 358/425 X |
| 3,585,586 | 6/1971 | Harmon et al. ..................... | 358/425 X |
| 3,588,330 | 6/1971 | Clark et al. ........................ | 358/469 X |
| 3,588,331 | 6/1971 | Vermillion ......................... | 358/469 X |
| 3,993,862 | 11/1976 | Karr . | |
| 4,598,411 | 7/1986 | Berkovich et al. . | |
| 5,001,571 | 3/1991 | Murano ............................... | 358/434 |
| 5,057,940 | 10/1991 | Murakami et al. .................. | 358/426 |
| 5,062,136 | 10/1991 | Gattis et al. ........................ | 380/18 |
| 5,072,308 | 12/1991 | Lin et al. ............................ | 358/426 |
| 5,170,266 | 12/1992 | Marsh et al. ....................... | 358/468 |
| 5,182,762 | 1/1993 | Shirai et al. . | |
| 5,291,302 | 3/1994 | Gordon et al. ..................... | 358/400 |
| 5,396,343 | 3/1995 | Hanselman ......................... | 358/426 |
| 5,402,248 | 3/1995 | Sato et al. .......................... | 358/426 |
| 5,414,526 | 5/1995 | Friedman ........................... | 358/426 |
| 5,420,692 | 5/1995 | Lin et al. ............................ | 358/426 |
| 5,455,680 | 10/1995 | Shin ................................... | 358/426 |
| 5,459,584 | 10/1995 | Gordon et al. ..................... | 358/434 |
| 5,515,177 | 5/1996 | Propach et al. .................... | 358/426 |
| 5,517,323 | 5/1996 | Propach et al. .................... | 358/409 |
| 5,528,385 | 6/1996 | Manning ............................ | 358/468 |
| 5,566,000 | 10/1996 | Propach et al. .................... | 358/412 |

FOREIGN PATENT DOCUMENTS

| | | | |
|---|---|---|---|
| WO 97/10668 | 3/1997 | WIPO .............................. | H04N 1/00 |
| WO 97/18665 | 5/1997 | WIPO .............................. | H04N 1/00 |

OTHER PUBLICATIONS

Product Information from the Xerox Website on the Xerox Workcenter 250, Copyrighted 1995, (www.Xerox.com).
Article: RADLinX, "Containing the Costs of FAX Transmissions—Intergrating Facsimile Machines and Internet/Intranet Networks", No Date.
Article: RADLinX, "PASSaFAX from RADLINX", 1995.
Article: Graphnet, Inc., "DigiTEL Product Description", 1995.
Article: Dialogic Corporation, "CPi/100™", No Date.

*Primary Examiner*—Bernarr E. Gregory
*Attorney, Agent, or Firm*—Pennie & Edmonds LLP

[57] ABSTRACT

A method and apparatus for implementing facsimile transmission over data networks is disclosed. In accordance with the preferred embodiment, the invention receives a modulated compressed facsimile message, which is then demodulated, decompressed and stored as a file. Thereafter, it is compressed for data transmission and sent to a server for transmission over a data network. At the receiving end, the file is decompressed and then re-compressed and modulated for transmission to a receiving facsimile machine.

49 Claims, 13 Drawing Sheets

METHOD AND APPARATUS FOR INTERFACING FAX MACHINES TO DIGITAL COMMUNICATION NETWORKS

This application corresponds to Provisional Application 60/019,380, filed Jun. 5, 1996.

FIELD OF THE INVENTION

This invention relates to a method and apparatus for interfacing facsimile (fax) machines to digital communication networks and to a method of fax transmission.

BACKGROUND OF THE INVENTION

Fax machines have long been used to transmit images from one location to another via a voice-grade telephone line. Such machines typically comprise a controller, a document scanner for converting the image of a document into a serial data message (and vice versa) and a modulator/demodulator, i.e. "modem", for converting the serial data into a series of tones (and vice versa) for communication on the telephone line. The telephone line may be a wire or optical cable, or may include a wireless connection such as a microwave, a satellite link or a cellular system. Generally, a sending fax machine will scan a sheet of paper and convert its image into a code for transmission over the telephone line. The receiving machine reconverts the codes and prints a facsimile of the original. Some fax modems can send and receive faxes, others can only send but not receive faxes.

In general, the various phases of a facsimile transmission are as follows:

Phase A is the call establishment phase in which the telephonic communication is established between a calling station, i.e. the station initiating the facsimile telephone call, and a called station, i.e. the station receiving the facsimile telephone call. Telephonic communication is established in the same way as in any telephone call: upon receiving a dial tone, the calling station provides the phone number of the called station to the telephone switching system, and, in response, the switching system establishes a circuit connecting the calling station to the called station and provides a ringing signal to the called station. The called station answers the ringing signal by going off-hook, i.e. the called station effectively lifts the receiver. For a facsimile transmission, as is well known, the calling station and the called station must have the capability of transmitting and receiving facsimile messages. Typically, this capability is provided by a transmitting fax machine and a receiving fax machine.

Phase B is a pre-message procedure phase or a negotiation phase between the calling station and the called station for identifying and selecting facsimile data encoding capabilities. Whichever station is to receive the facsimile message transmits a digital identification signal (DIS) to the transmitting fax machine. The DIS contains information indicating the data encoding capabilities of the receiving fax machine. The transmitting fax machine uses the information in the DIS to determine the appropriate data encoding format.

Phase C is the actual message transfer phase and comprises two simultaneous phases. Phase C1 is the "in-message" procedure phase, which controls the transfer of data between the transmitting fax machine and the receiving fax machine. This includes synchronization, error detection and correction, and line supervision. Phase C2 is the actual data transmission phase in which encoded data is transferred by the transmitting fax machine to the receiving fax machine under control of the signals generated in the C1 phase.

Phase D is the post-message procedure phase in which information is transferred regarding the end-of-message signaling, confirmation signaling, and end of facsimile signaling.

Phase E is the call-release phase in which the telephonic communication between the calling station and the called station is terminated.

The cost of sending a facsimile message long distance includes the transmission cost of the telephone call, which cost is directly related both to the size of the message being sent and to the transmission speed at which the message is sent. In some cases the cost of sending a facsimile message is also related to the time of day during which the facsimile telephone call is placed. To reduce costs, the user may send the facsimile message during low-cost periods, such as at night, when the demand for telephone lines is minimal. Thus, the telephone rate is decreased and the cost of sending the facsimile message is correspondingly decreased. The cost can also be reduced by minimizing the duration of the facsimile telephone call.

Although fax machines have gradually become faster and more efficient through the years, current standards and technology still limit the fax transmission speed. Fax machines in the 1960's (Group I) were analog units capable of transmitting a page within four to six minutes. These were replaced by fax machines introduced in the mid-1970's (Group II) which were capable of transmitting a page within two to three minutes. Group III fax machines are capable of transmitting at a rate of 9 to 20 seconds per page. Virtually all fax machines in the market today are Group III machines. Newer fax machines (Group IV) offer an even faster transmission speed of approximately 5 seconds per page. However, Group IV fax machines require access to digital telephone lines in order to achieve these high transmission speeds.

The cost of transmission can be reduced by minimizing the duration of the facsimile telephone call. One such method for minimizing the duration of the telephone call is to compress the data prior to transmission. Early facsimile machines used a basic data encoding technique, known as Modified Huffman (MH) encoding. This form of encoding permits compression of the facsimile message, with a corresponding decrease in the duration of the facsimile telephone call. Other data encoding techniques were developed for newer facsimile machines, although newer facsimile machines continue to retain MH encoding capabilities to enable facsimile communication of the older design. A Modified Read (MR) encoding permits two dimensional data encoding, which permits a higher degree of data compression than MH encoding permits. Both MH and MR encoding are described in standards established by the International Telegraph and Telephone Consultative Committee (CCITT) and published as *Terminal Equipment and Protocols for Telematic Services* (1989). The MH and MR data encoding are described in recommendation T.4 of the CCITT standard.

A third type of data compression is the Modified Modified Read (MMR) encoding, described in recommendation T.6 of the CCITT standard, which permits two dimensional encoding of low- or high-resolution facsimile messages.

Other types of data compression, such as Joint Bi-level Image Experts Group (JBIG), offer even greater compression capabilities than MMR but have not generally been integrated into fax machines. The JBIG data encoding is described in recommendations T.82 and T.85 of the CCITT standard. Generally, JBIG compresses binary (one bit/pixel)

images. JBIG provides a compatible progressive/sequential coding, meaning that a progressively coded image can be decoded sequentially, and the other way around. All bits in the image, which is compressed using the JBIG format, before and after compression and decompression will be exactly the same. For further information concerning the use of data compression techniques in facsimile, see Gilbert Held, *The Complete Modem Reference*, (2d Ed.), pp. 237–256 (Wiley 1994) and Andrew Margolis, *The Fax Modem Sourcebook*, pp. 111–134 (Wiley 1995), both of which are incorporated herein by reference.

Another method for reducing the length of the telephone call is to increase the rate or transmission speed at which the message is sent. Most fax machines typically transmit data at a rate of 9.6 and/or 14.4 kilobits per second (kbps). Some modems can transmit fax at rates of 28.8 kbps or higher, but these are generally not used in the current installed base of fax machines.

Alternatives to the use of fax machines are well known. Many personal computers now have a modem and the capability of generating the serial data message of a facsimile internally without the need to scan a document. These computers also have the capability of executing the communication protocol required to transmit the message to a remote fax machine. These computers, however, transmit data using communications techniques employed by fax machines which are not as efficient as various other data communication methods. In addition, these computers transmit only computer files that are stored in digital format and are not useful for processing paper documents.

Many modern personal computers also have the capability of transmitting e-mail to a remote computer using various packet-switched digital communication networks such as the Internet. E-mail, however, is of no use if the message to be sent is initially in the form of document that has to be scanned.

From the foregoing it will be apparent that fax machines typically encode data somewhat inefficiently, transmit data at relatively slow rates (compared to computer generated facsimiles or e-mail), and use circuit-switched rather than packet-switched networks. While e-mail may be a more efficient communication medium, it does not provide any means for transmitting pre-existing documents other than re-creating them anew as e-mail documents. Moreover, there are currently millions upon millions of fax machines already in operation.

Thus, it is desirable to achieve efficiencies of packet-switched digital communication networks while continuing to use existing fax machines as well as to introduce fax machines which communicate over such networks. There is also a need for cost savings in fax transmission and, in particular, there is a need to reduce long distance telephone charges associated with faxes.

SUMMARY OF THE INVENTION

Generally, the present invention relates to a method and an apparatus for compressing and encoding a facsimile message into an image data file, encapsulating the compressed file within a data file and automatically transferring the file to a remote computer. The present invention is also directed toward the capability of receiving encapsulated compressed and encoded files and de-encapsulating, decompressing and decoding such files into a conventional facsimile format. The apparatus further provides a capability of storing the data and forwarding it using a high speed modem.

This invention provides an interface to fax machines or other devices communicating via fax modems. The interface is operatively connected to a series of computers ("servers") linked over a wide-area network (collectively referred to as "service"). The service receives a file from the apparatus and sends it to the appropriate destination. The service can determine the capability of the intended recipient of the file and, based on the determined capability of the recipient, send the file in a suitable format. For example, if the recipient is not equipped with an interface of the present invention, the server de-encapsulates, decompresses and deciphers the message prior to transmission to the recipient.

BRIEF DESCRIPTION OF THE DRAWING

These and other objects, features and advantages of the invention will be more readily apparent from the following detailed description, taken in conjunction with the accompanying drawings, in which the reference characters refer to like parts throughout, and in which.

DETAILED DESCRIPTION OF THE INVENTION

Figure 1:
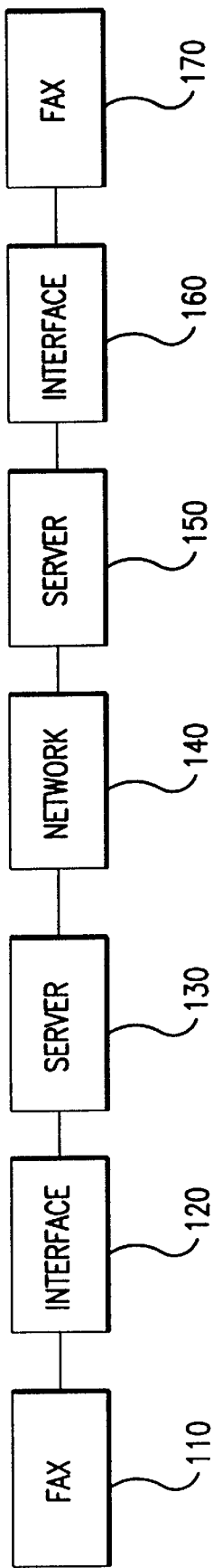
FIG. 1 is a block diagram of a communication system of the preferred embodiment of the invention.

In the preferred embodiment, the present invention implements fax transmission over a packet-switched digital communication network. As illustrated in FIG. 1, a preferred embodiment of the system of this invention comprises a first fax machine 110, a first interface apparatus 120, a first server 130, a packet-switched digital communications network 140, a second server 150, a second interface apparatus 160 and a second fax machine 170. The first and second interfaces 120 and 160 may be incorporated into a fax machine during the manufacturing process or alternatively attached to existing fax machines on a stand-alone basis.

The elements of FIG. 1 are interconnected by communication lines which may be any appropriate connection suitable for passing the signals being transmitted. Illustratively, they may be circuit leads on printed circuit boards, copper wires, optical fiber, satellite, circuit switched network, or radio links. In the case where the interface is incorporated in the fax machine, the connection between the interface and the fax machine typically is made through circuit board and backplane wiring. If the interface is external to the fax machine the connection is typically made with a wire cable which can be the conventional unshielded twisted pair of the standard analog phone line. The connection between the interface and the server is typically made over the public switched telephone network or over a private telephone line. The telephone line can be a standard analog 3000 Hz bandwidth line using unshielded twisted pair.

Preferably, however, the telephone line is a digital line such as a 64 kbps ISDN line or a fractional T1 line. This line can be circuit-switched or packet-switched. Network 140 which interconnects servers 130 and 150 preferably is a packet-switched wide area network such as the Internet or a private communication network.

The system of the current invention alters the traditional facsimile transmission by inserting at least one of the interfaces 120, 160 into the usual phases of a fax transmission so as to enable communication over computer networks. Also, unlike a traditional fax transmission, the system and method of this invention preferably provides a centralized service that may process transmitted data. This service includes a series of computers, or servers 130, 150, that are geographically distributed and linked in a wide-area network (WAN) 140.

To transmit a fax message from the first fax machine 110 to the second fax machine 170 using digital communication, the first interface apparatus 120 intercepts the fax message, enhances its data compression, and transmits it as an image data file using a data modem. As illustrated in FIG. 1, the message is sent from the first interface apparatus 120 to a local server 130. The local server receives the message, encapsulates it within a data file, and forwards it to network 140 which delivers the message to the remote server 150.

Upon receiving the message from the network, the remote server 150 de-encapulates the image data file and transmits it to the second interface apparatus 160, which converts the image data file to a conventional fax message format and transmits it to a second fax machine 170. In the case of fax messages that are transmitted from the second fax machine to the first, the roles of the first and second interfaces 120 and 160 are reversed.

The process is the same in the case where the connection between the interface and the server uses an analog communication line except that the message is transmitted in analog form using an analog (or fax) modem.

If the servers of the invention are connected by the Internet or another data network in which the ability of a third party to intercept the message is a concern, the interface or the server sending the data file may encrypt the message using encryption methods, such as a commercially known algorithm provided by RSA, Inc, or other security methods known to those skilled in the art. The encrypted message is decrypted at server 150 or interface 160.

Figure 2A:
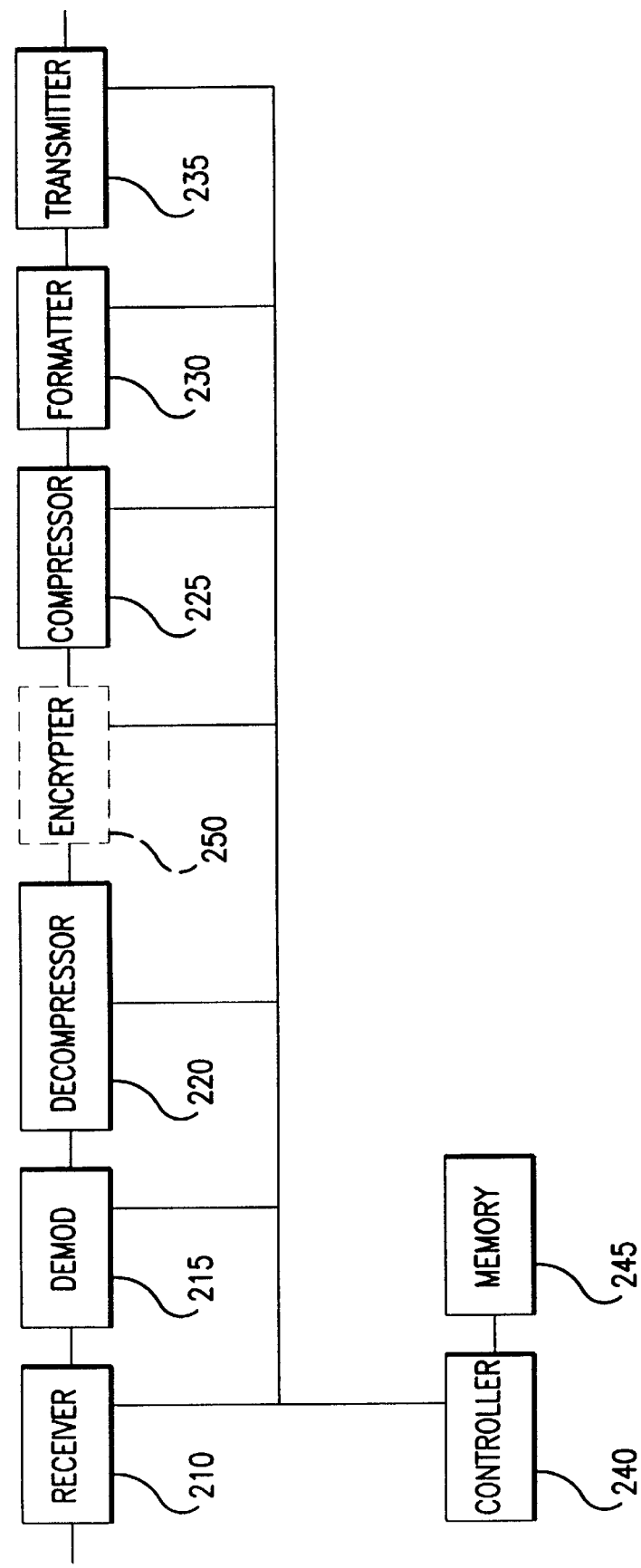
FIGS. 2A and 2B are schematic illustrations of components of the preferred embodiment.
Figure 2B:
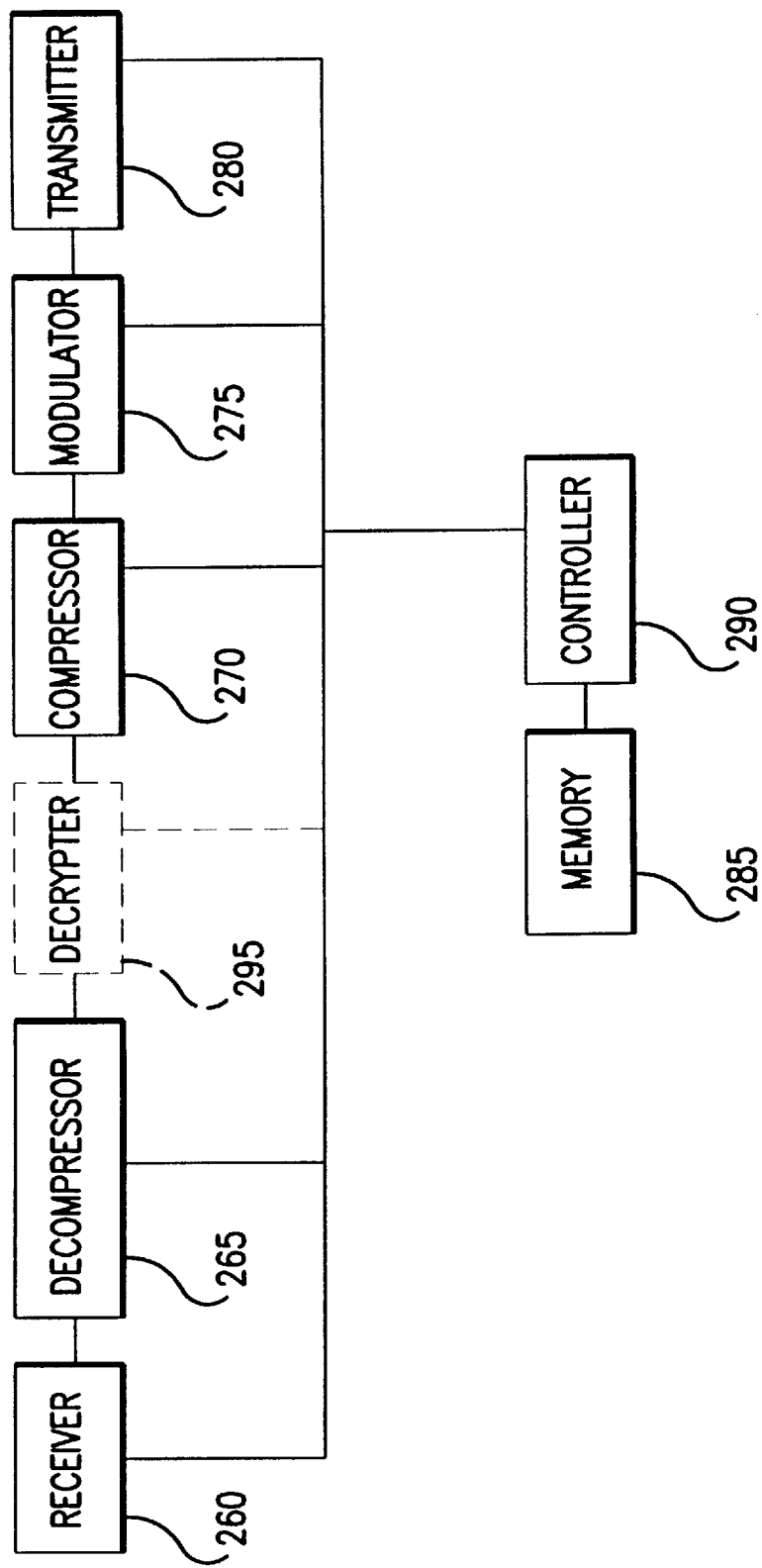

As illustrated in FIG. 2A, a preferred embodiment of the first interface apparatus 120 comprises a receiver 210, a demodulator 215, a decompressor 220, a compressor 225, a formatter 230, a transmitter 235, a controller 240 and a memory 245. Optionally, the apparatus also comprises an encrypter 250. As illustrated in FIG. 2B, a preferred embodiment of second interface apparatus 160 comprises a receiver 260, a decompressor 265, a compressor 270, a modulator 275, a transmitter 280, a controller 285 and a memory 290. Optionally, the apparatus also comprises a decrypter 295. The capabilities of the interfaces 120 and 160 can be combined in the same physical device so as to implement two-way (or full-duplex) transmission of facsimile messages. In such case, a single controller and memory can be used for both the first interface and the second interface; the functions of demodulator 215 and modulator 275 can be provided by a single analog modem operating at speeds typically of 14.4 kbps or less; and the functions of transmitter 235 and receiver 260 can be provided by a single data modem operating at speeds typically of 28.8 kbps or more. In general, as understood by a person skilled in the art, the apparatus can be implemented using a special purpose architecture as well as a general purpose computer.

Figure 3:
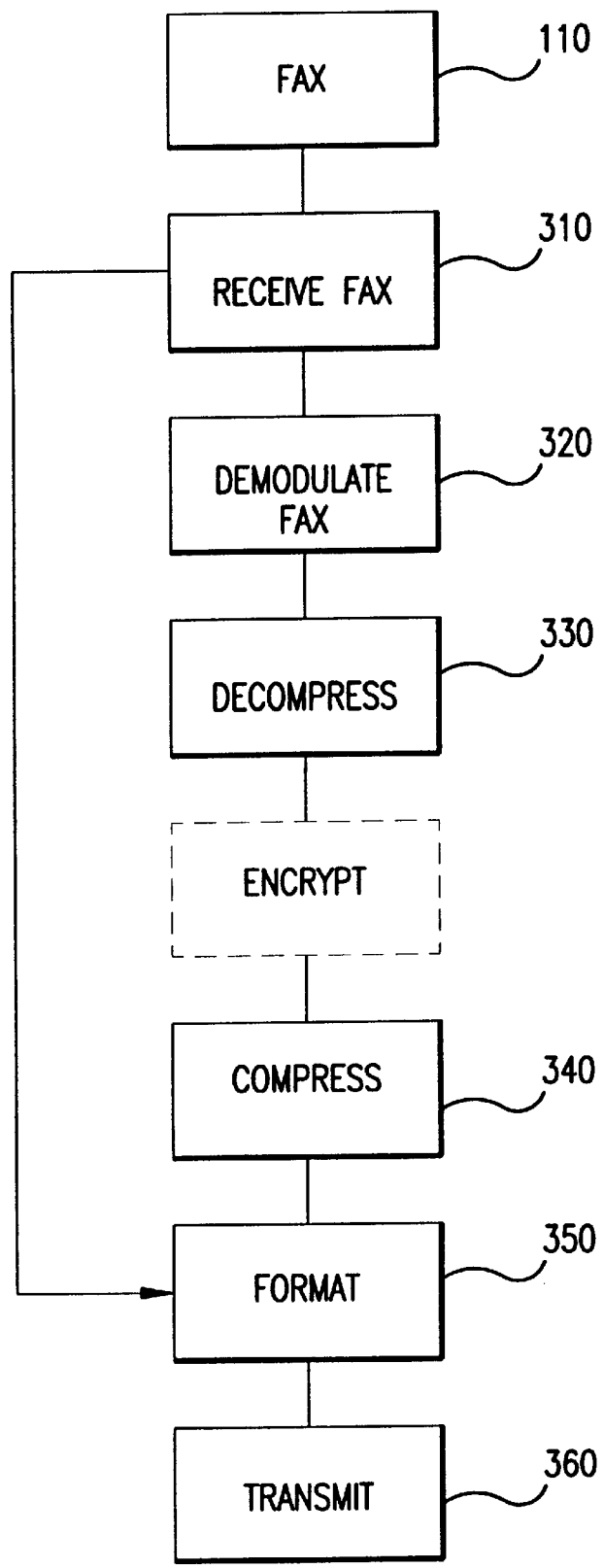
FIGS. 3 and 4 are flow charts depicting the operation of the first and second interfaces of the invention.
Figure 4:
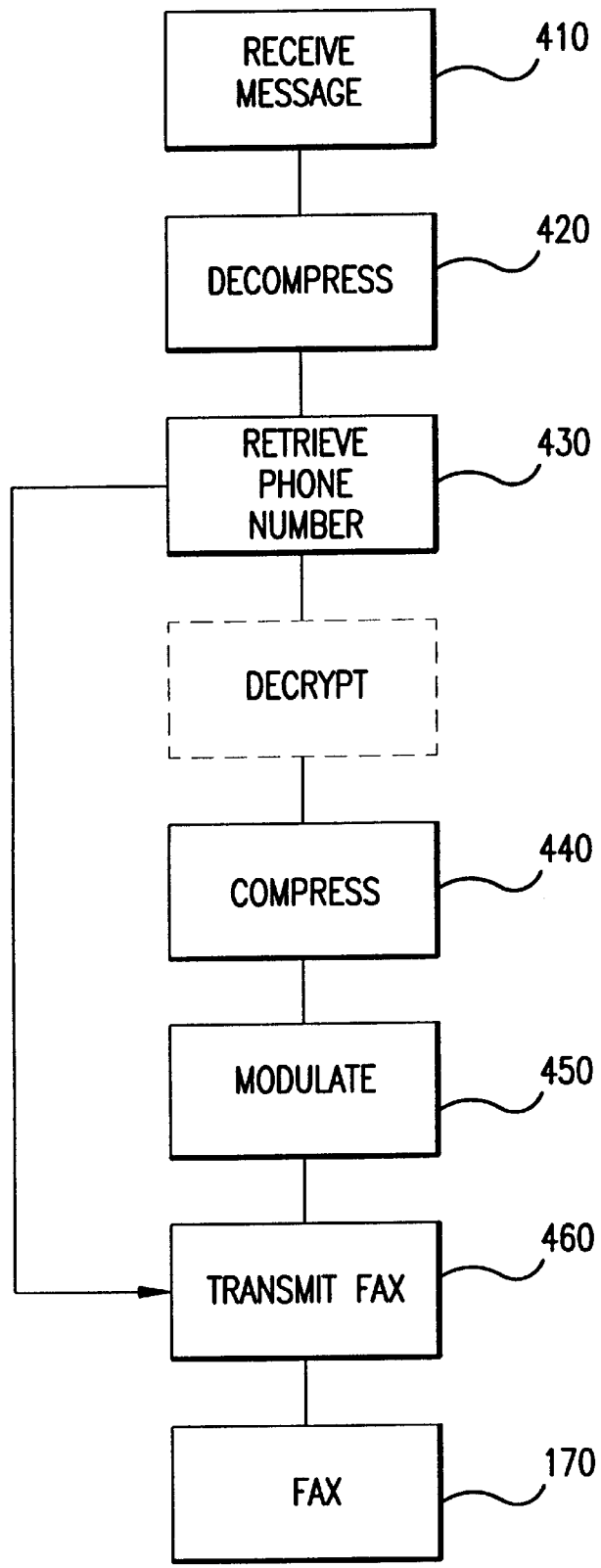

The operation of the first and second interfaces 120 and 160 is depicted in greater detail in FIGS. 3 and 4, respectively. In block 310 of FIG. 3, the first interface apparatus 120 receives the fax message from the fax machine 110. As part of this step, the interface 120 simulates certain functions of both the telephone switching system and the called fax machine. Thus, it provides a dial tone to the calling station when the calling station initiates the call by effectively going "off-hook". Further, it recognizes the message as a fax message and executes the called station's portion of the protocol required for transmission of a fax message with the first fax machine 110. In particular, the interface 120 receives the telephone number of the called station and returns an off-hook signal to the fax machine 110 in order to complete phase A of the fax transmission, returns a DIS in order to complete phase B, and also executes phases C, D and E of the fax transmission protocol. The phone number is provided to controller 240 for use in the formatting step as described below. The first fax machine 110 continues to operate under the premise that it is communicating with a second fax machine.

The fax message transmitted from first fax machine 110 is a sequence of tones which the first interface 120 demodulates at block 320. This demodulated signal, which is typically in a standard compressed format used for transmitting faxes is then decompressed at block 330 for further processing. Thereafter, the message is compressed at block 340 using a more efficient algorithm with a higher compression ratio.

Preferably, the newly compressed message is then formatted as an image data file for transmission over a data modem (block 350) and transmitted to the server 130 (block 360), which performs the processing required to encapsulate the message in a data file for a packet-switched transmission and routes the packets to the network 140. As part of the formatting step, controller 240 inserts the phone number of the called system into the message.

Network 140 delivers the packets to server 150. Server 150 de-encapsulates the received message, retrieves the phone number information from the message, and initiates a phone call to second fax machine 170. This call is intercepted by second interface 160 which uses a conventional data handshake protocol to establish a connection. Upon establishing a connection, server 150 transfers its message to the second interface. Preferably, the communication line between the server and the second interface is a digital line.

The operation of the second interface 160 is the reverse of the operation of the first interface 120. In FIG. 4, the second interface 160 receives the message from the second server 150 (block 410) and decompresses it (block 420). It then retrieves the phone number information from the message (block 430) and compresses the message using a standard fax compression algorithm compatible with the addressed fax machine (block 440). It also modulates the compressed message using a conventional fax modulation (block 450). Finally, using the retrieved phone number, it transmits the reconstituted fax message to the second fax machine 170 as a conventional fax transmission to the called fax machine 170. In this case, the second interface apparatus 160 acts as the calling station and executes the calling station's portion of phases A, B, C, D and E of the fax transmission protocol.

Interface 160 may receive data from the remote server 150 at faster rates than it can transmit data to the receiving fax machine. To prevent a memory overflow in the interface, remote server 150 adjusts the rate of information flow in accordance with the data transmission capabilities of the interface. Data transfer rates between the server and the interface may be established at the time the server connects with the interface. Alternatively, as the message is being received at the receiving interface, the interface may transmit a wait signal to the server so as to suspend transmission until the interface indicates that it is ready to resume receiving data.

There are generally three modes of operation associated with the present invention: the send mode, the receive mode and the idle mode. The interface remains in an idle mode until it is awakened by a local server or remote computer or fax machine. The apparatus may be configured so that it receives messages only from authorized senders. If it receives a message from a non-authorized sender, the message is passed directly to the destination fax without processing.

Figure 8A:
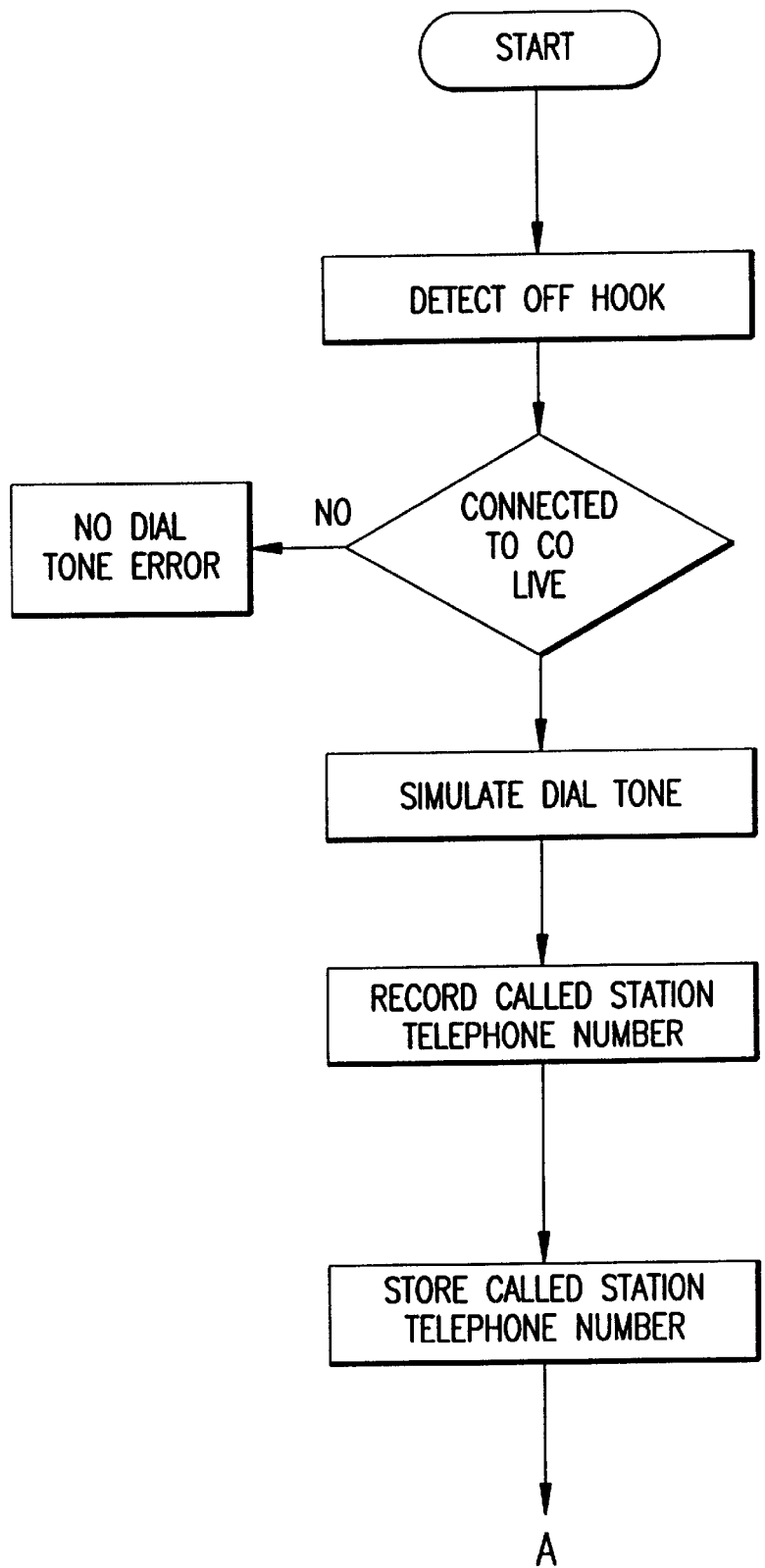
FIGS. 8A–8E provide a detailed flow chart of the operation of the invention in the send and receive modes.
Figure 8B:
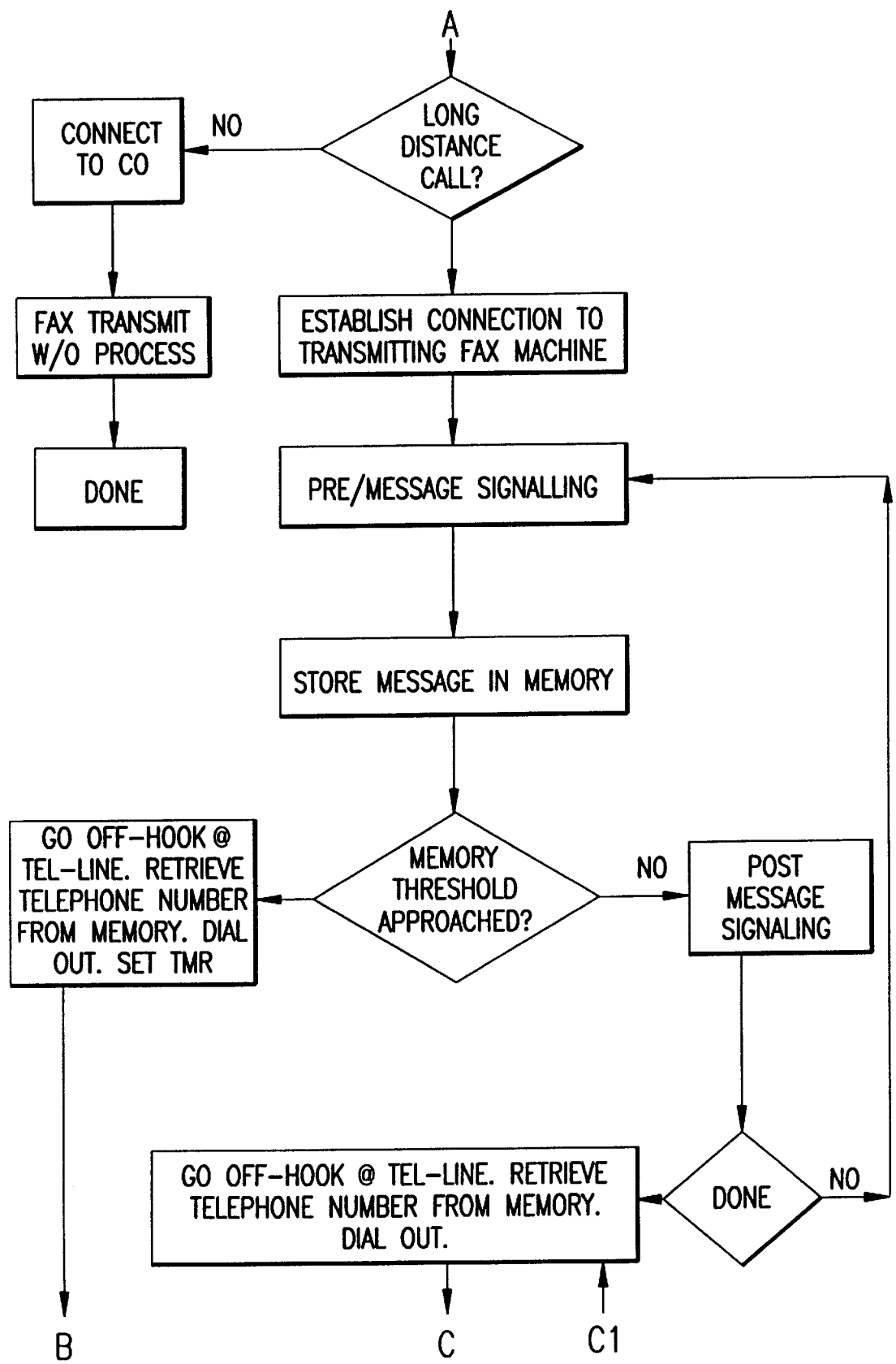
Figure 8C:
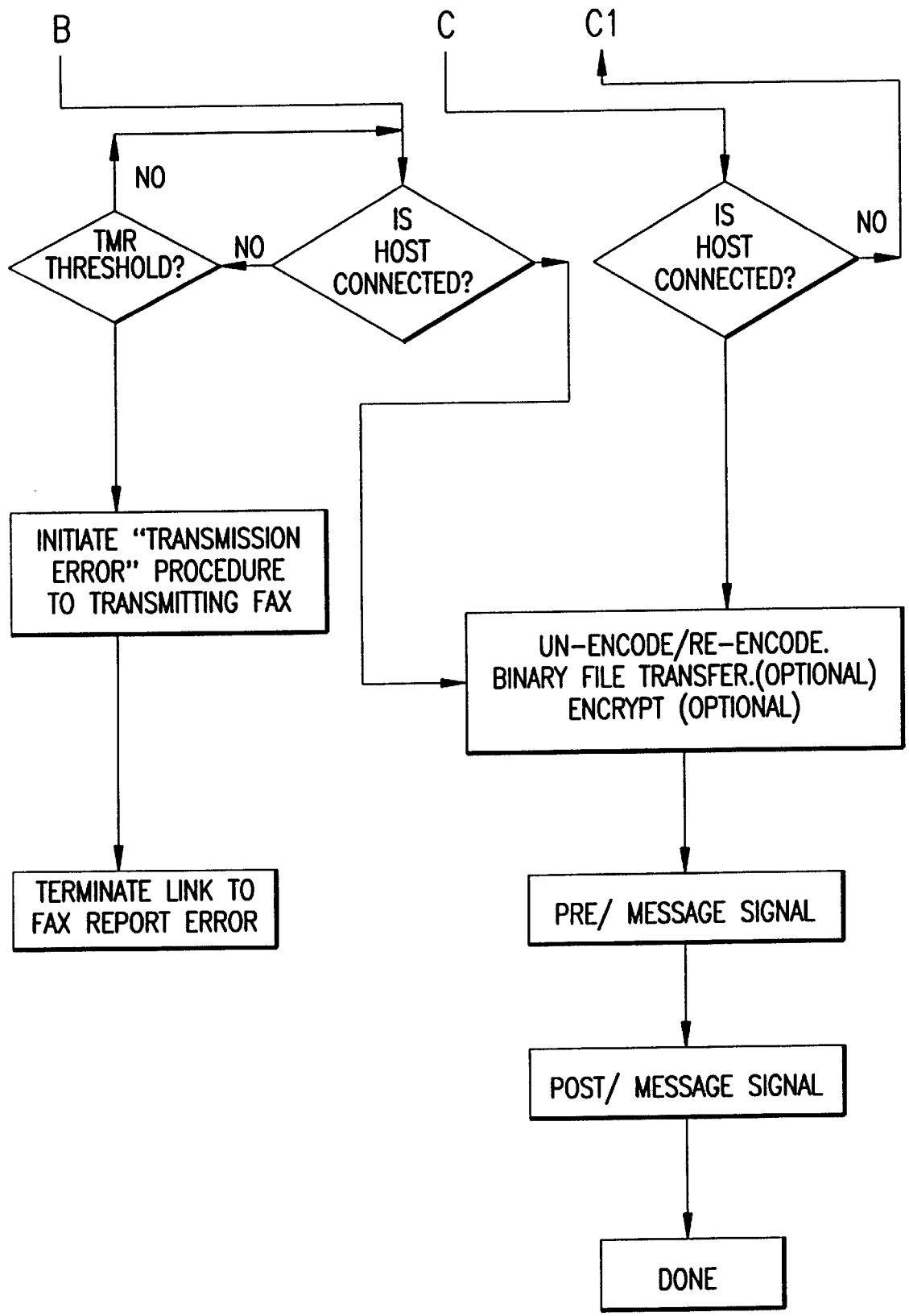

FIGS. 8A–8C, are a flow diagram illustrating the send mode operation. It is generally associated with the operation of the first interface 120 described above, in particular in connection with FIG. 3. The following discussion provides further details of the interface operation and should be considered in conjunction with the discussion above.

Initially, the first interface simulates certain functions of the telephone switching system and the called fax machine to establish a connection with fax machine 110 and to receive the fax message being sent by the fax machine. Thereafter, it processes the message and sends it on to server 130.

Thus, operation in the send mode begins when the first interface apparatus 120 detects an off-hook signal from fax machine 110. In response, it checks that the connection to the Central Office ("CO") is live, i.e. checks for a simple dial tone on the phone line from the Central Office. If the connection is not live, then a no dial tone error message is returned to the fax machine 110.

If a dial tone is available on the phone line, interface 120 then establishes a connection to the fax machine 110 by simulating a dial tone on the line to fax machine 110. At the same time, interface 120 starts a stop-watch to keep time of the faxing process (after the faxing process has been completed, the stop-watch is stopped). This information can be used for billing.

Upon recognizing the dial tone, fax machine 110 dials out. First interface 120 detects the destination phone number that is dialed, records the number and stores it in memory. Fax machine 110 and interface 120 continue to execute all the phases of a facsimile transmission with interface 120 simulating the role of the called station. During Phase B, interface 120 provides a DIS. In phase C, the interface receives the message transmitted directly from the transmitting fax machine. This message is usually in a Group III or Group IV compressed fax format (standard T.4 or T.6) and includes sender/receiver information.

Preferably, the message is temporarily stored while the interface continues to receive the remainder of the message from fax machine 110. However, the memory of the apparatus may store only a limited quantity of data, for example, 512 KB or 1024 KB or the equivalent of a predetermined number of faxed pages. Thus, at a predetermined memory threshold level, the interface retrieves from memory the phone number of local server 130 and dials local server 130 so as to start the process of forwarding the message to the local server. Alternatively, interface 120 operates in real-time mode so that it holds nothing in memory and passes the message through a message buffer as it processes information.

The interface memory preferably contains a list of phone numbers of several alternative choices for local servers. These numbers preferably can be updated remotely. When interface 120 dials the first local server, it initiates a timer. If the initial number does not result in a connection with the local server, the interface sequentially attempts to connect with a local server using the alternative numbers. If the local server, or host, is not connected to the interface before the timer reaches a predetermined threshold, interface 120 initiates a transmission error procedure to fax machine 110 and terminates the transmission. The error is also reported to the host. However, if the interface connects to the local server prior to the timer reaching its threshold, the interface re-encodes the message and begins transmission of the message to the local server by way of its data modem. The first interface uses a conventional data handshake protocol to establish a connection with the local server.

As noted, prior to the transmission to the local server the message (or a portion thereof) is re-encoded. More specifically, the interface 120 demodulates and decompresses the fax message which is, as indicated, usually encoded in accordance with CCITT recommendation T.4 or T.6 The interface 120 then re-compresses the message on-the-fly using an enhanced compression algorithm.

For example, the apparatus uses the appropriate standard methodology, such as MH, MR or MMR to decode the faxed data. Then it may use standard Binary Transfer Protocol (BFT) to convert the unencoded image to raw data. (BFT is known to those skilled in the art and is a recommended standard of the CCITT under recommendation T.434.) The interface next uses an enhanced encoding method, such as JBIG, to re-compress the data. Other compression techniques can also be employed including other lossless compressions as well as lossy compressions. The output of the procedure is an encoded data file. Optionally, the interface 120 will encrypt the message for confidentiality reasons before the message is sent to a local server.

The apparatus encapsulates the body of the re-compressed fax message together with other message information, such as calling station identification and called station identification. An example of a data structure for the file that is transmitted from the apparatus to the local server or remote computer is that of an e-mail message formatted using a standard Internet e-mail protocol. In this example, the information relating to called station telephone number is stored in the "addressee" field provided by the standard Internet e-mail format. For example, an e-mail file could yield the following address: 12025551212@NewService.com. The digits preceding the '@' identify the destination telephone number and NewService.com identifies the address of the remote server to which interface 120 directs the message. Similarly, the body of the message is inserted into the file in accordance with standard Internet e-mail file attachment. The method of transmitting a fax message in a standard e-mail format is known to those skilled in the art and can be found in the TPC.INT subdomain recommendation, C. Malamud and M. Rose, *Principles of Operation for the TPC.INT Subdomain: Remote Printing—Technical Procedures,* Internet Multicasting Service and Dover Beach Consulting, Inc., October 1993; C. Malamud and M. Rose, *Principles of Operation for the TPC.INT Subdomain: General Principles and Policy,* Internet Multicasting Service and Dover Beach Consulting, Inc., October 1993; C. Malamud and M. Rose, *Principles of Operation for the TPC.INT Subdomain: Remote Printing—Administrative Policies,* Internet Multicasting Service and Dover Beach Consulting, Inc., October 1993, which are incorporated herein by reference.

If the transmitted document is large enough to overflow memory of the interface, the first interface may keep the connection to the local server open until the document has been completely transmitted from the transmitting fax machine through the interface and to the local server. Alternatively, the interface may close the connection until it has completed Phase E with the transmitting fax machine or until the interface again achieves the threshold memory level. In other words, in this alternative the connection with the server is maintained only when needed for a portion of a long document to be transferred to the server. After the message transfer and post-message signaling phases, the first interface 120 disconnects from the local server.

Preferably, the message is sent to a local server which is in the local (i.e., not long-distance tolls) area of the first interface 120. The server then sends the message over a WAN or the Internet, to a remote server 150 in the local area of the called fax machine 170. The transmission is completed by the remote server 150 sending the message to the second interface apparatus 160 which in turn receives the message and sends it to the called fax machine 170. To accomplish this routing, the telephone number received from the fax machine 110 must be used to identify a network server 150 located close to the called fax machine 170. In addition, the address of the server 150 as well as the telephone number should be incorporated into the message forwarded from the transmitter 235 (FIG. 2). A look-up table may be maintained in memory 245 in order to associate phone numbers with appropriate (e.g., nearby) servers 150. This look up table can also be stored at the local server 130. As discussed below, a special central server can also be provided to facilitate routing.

Figure 7:
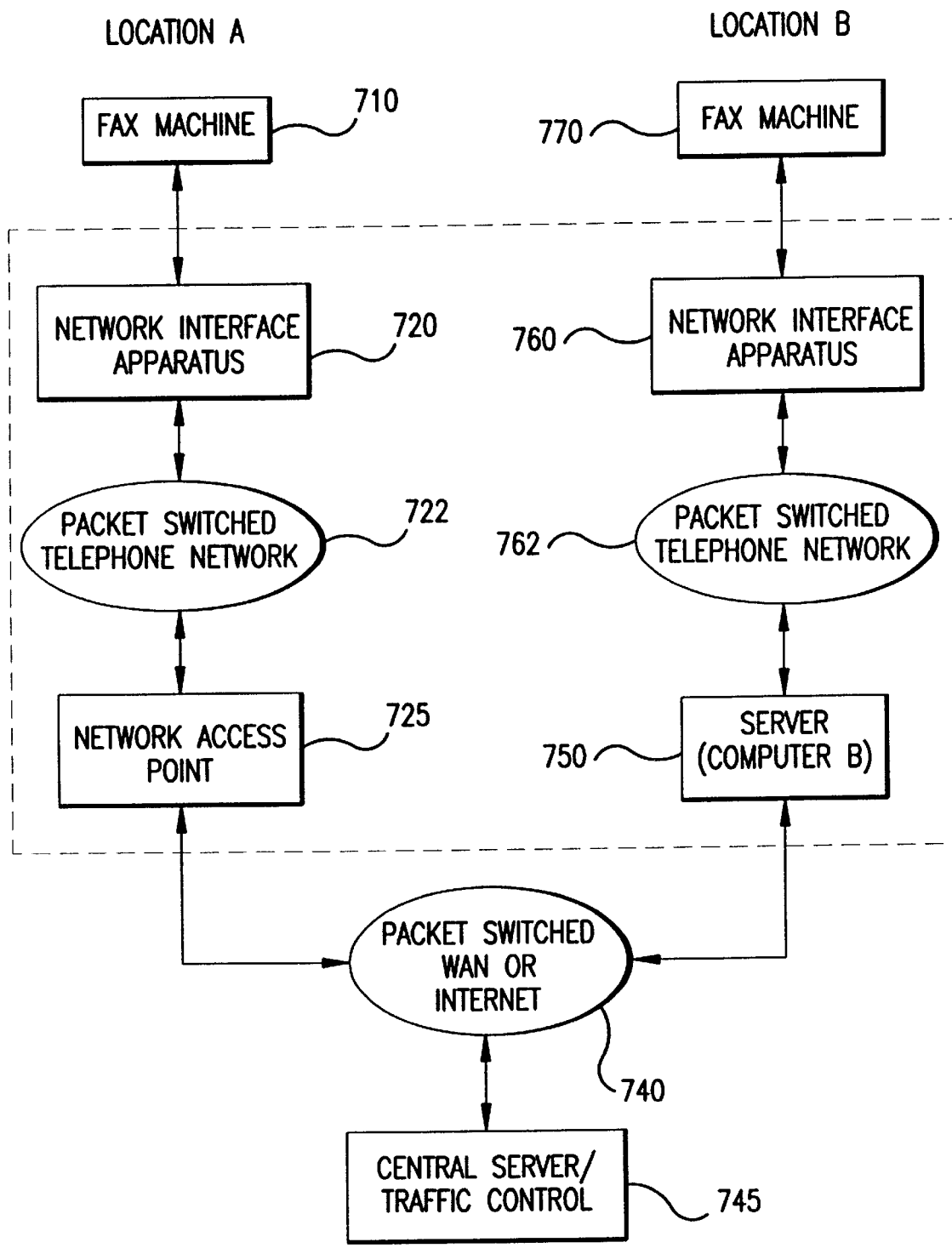
FIG. 7 is a schematic illustration of a fax communication system utilizing a central server/traffic control system.
Figure 8D:
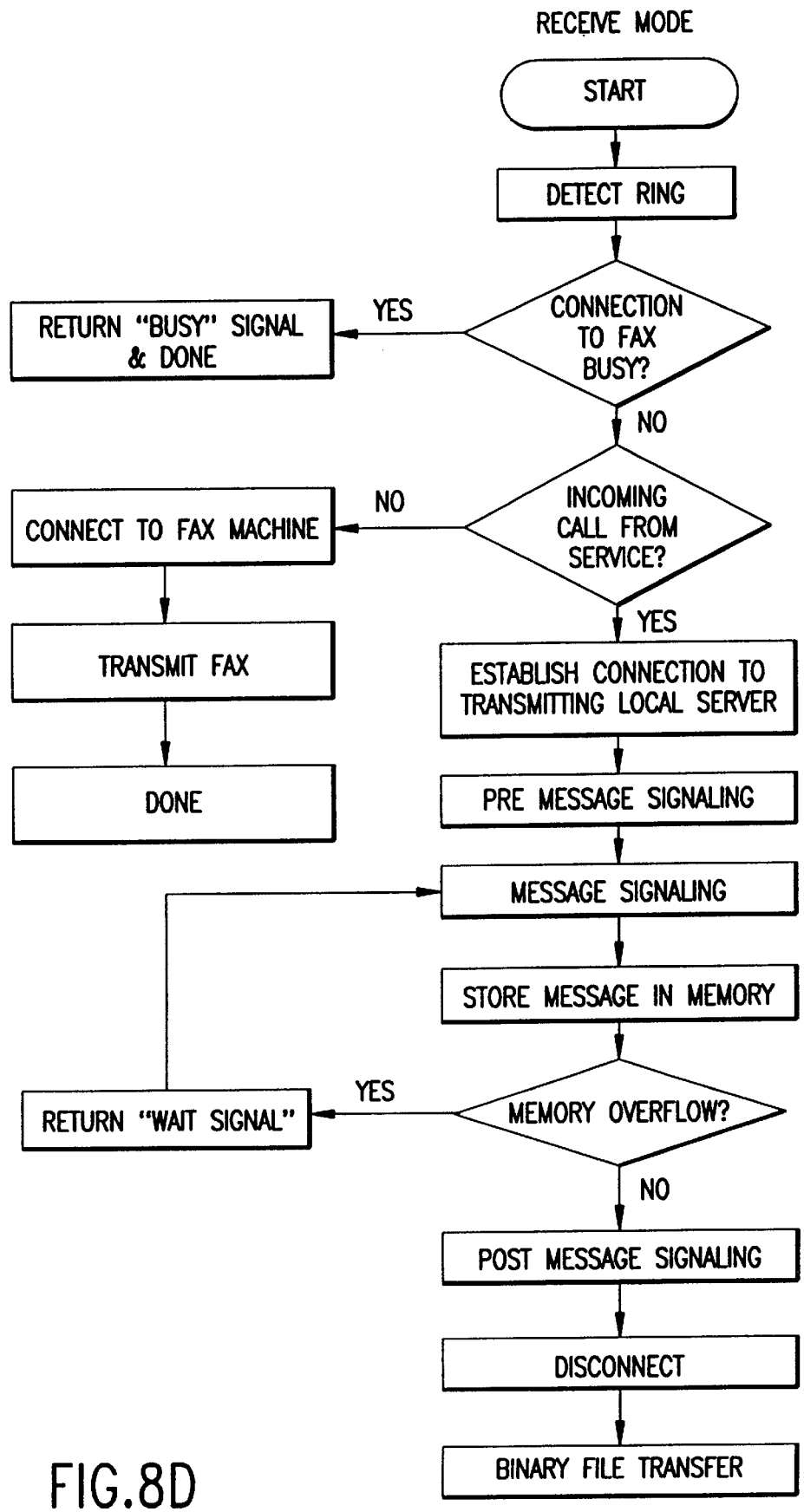
Figure 8E:
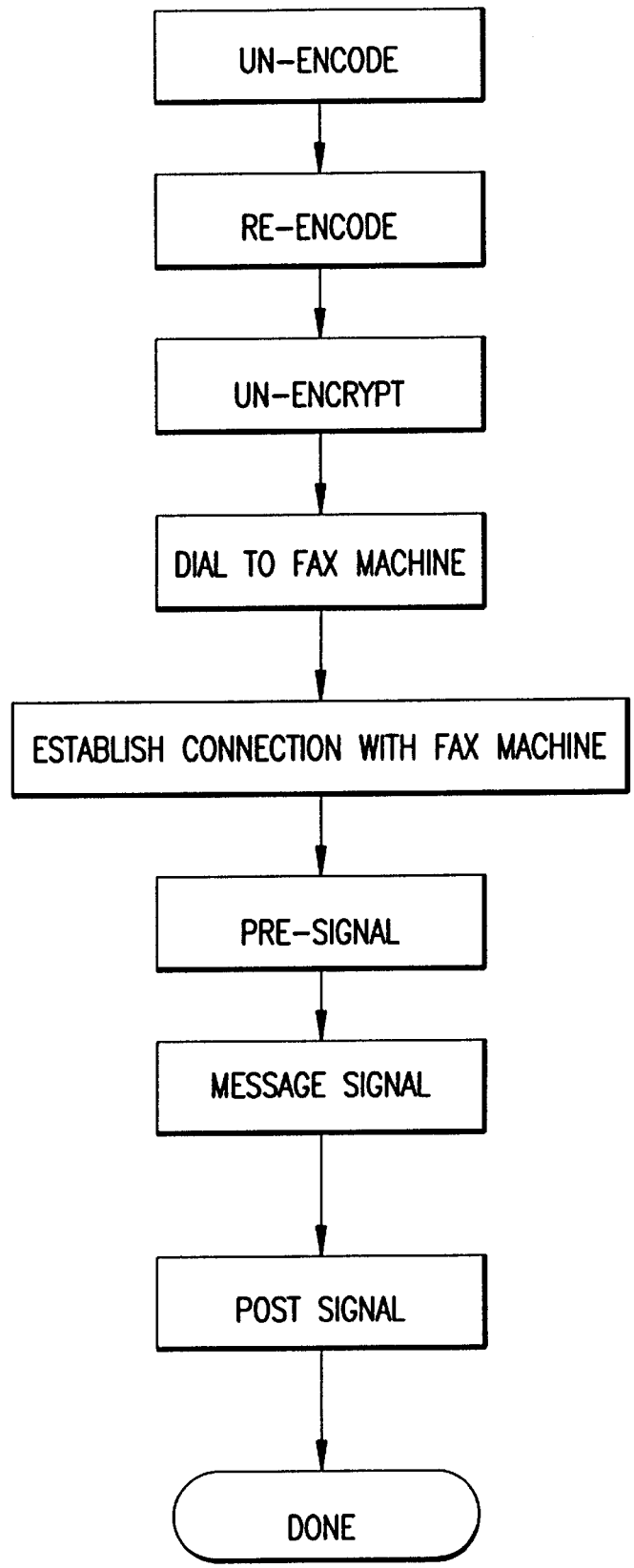

FIGS. 8D and 8E are a flow diagram illustrating the receive mode of operation. The following discussion is also coextensive with the discussion of the operation of the second interface in conjunction with FIG. 4. In addition, since the receive mode is in many respects the reverse of the send mode, various details of the process depicted in FIGS. 7D and 7E will be understood from the drawings by persons skilled in the relevant art in view of the preceding discussion and will not be repeated here.

Initially, the interface detects a ring and determines whether the receiving fax machine is available to receive a transmission. If the fax machine is busy, or otherwise unavailable, the interface returns a "busy" indicator to the calling entity. If the fax machine is available, the interface then determines if the transmission is in the form of a data message from the server or it is an ordinary fax. An ordinary fax is simply transmitted to the fax machine without further processing. If the "ring" has been originated by the server, however, the interface proceeds to establish the connection to the server and then receives and stores a data file.

Interface 160 de-encapsulates the received data file and separates the file into its components, that is, information relating to the calling and called stations and data related to the message being transmitted. Both components are stored in the memory of the interface. If the message has been encrypted, the apparatus uses the appropriate commercially available encryption software, such as RSA or another encryption algorithm, to de-crypt (decipher) the message. Based on the methodology that was used by the first interface 120 for encoding, the second interface decodes the message and converts it to raw data. The interface then uses known encoding techniques for fax machines to re-encode the data. The second interface 160 retrieves the destination telephone number from memory and automatically dials the receiving fax machine. Interface 160 then simulates a transmitting fax machine to establish a connection with called fax machine 170 and then transmits the received data to the called fax machine.

Figure 5:
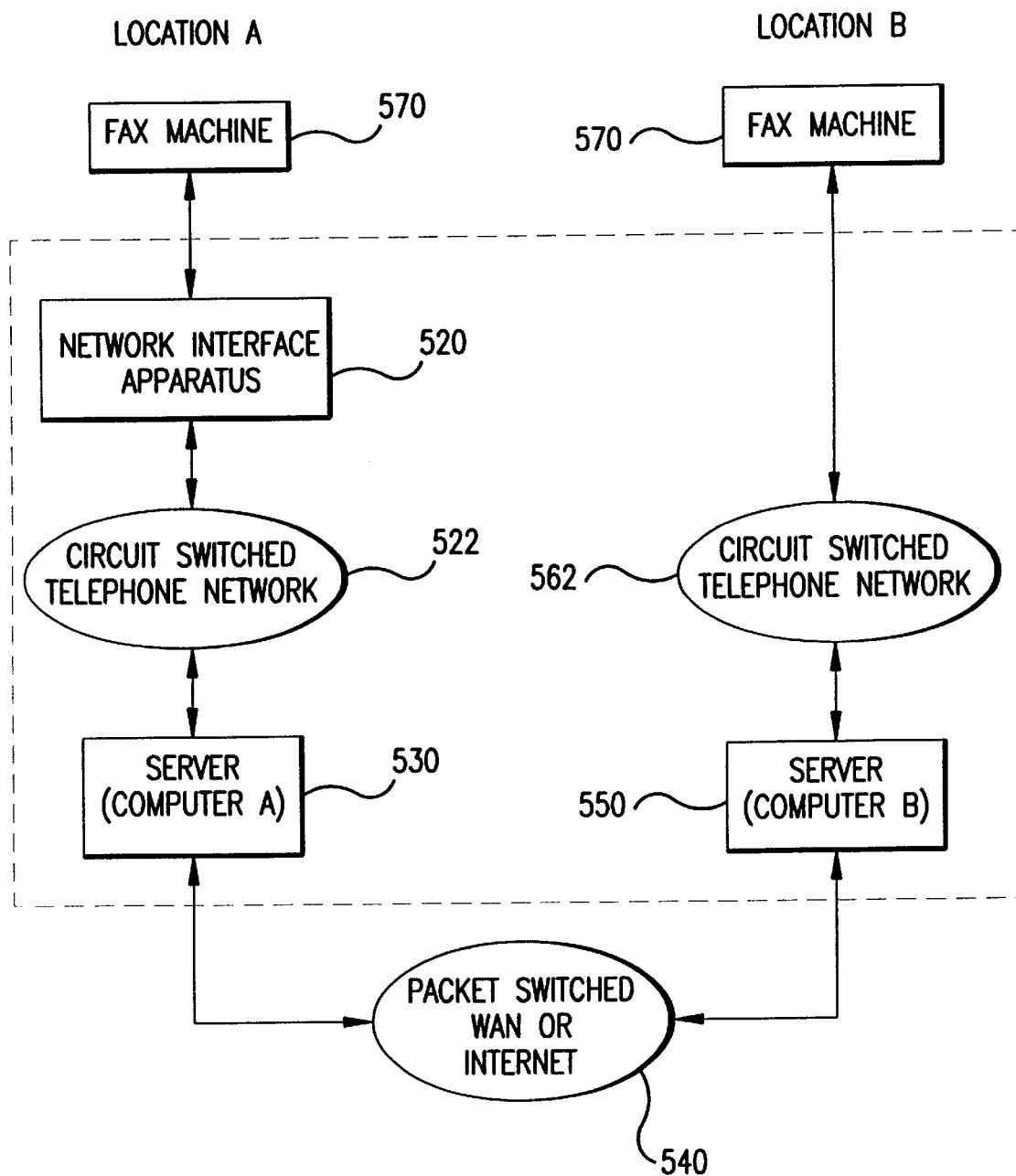
FIG. 5 is a schematic illustration of a fax communication system in accordance with the present invention in which there is no interface of the invention at the called station.

The destination fax machine, however, will not always have the interface of this invention associated with it. FIG. 5 illustrates an embodiment in which destination fax machine 570 does not have an associated interface of this invention. In this case, the elements of FIG. 5 which are similar to those of FIG. 1 bear the same reference numerals increased by 400. As in the case of the operation of server 150, remote server 550 de-encapsulates the data file and separates the file into its components, i.e., information relating to the calling and called stations and to the message being transmitted. Both components are stored in the server's memory. If necessary, the server 550 uses appropriate commercially available software (e.g., RSA) to decrypt the message. Thereafter, it decompresses the message, based on the information regarding the encoding used for the message, and converts it to raw data. Then, remote server 550 uses standard fax encoding techniques, such as MH, MR or MMR, to re-encode the data. Next it retrieves the destination telephone number from memory and dials the called fax machine 570. Remote server 550 then simulates a transmitting fax machine and performs the fax transmission sequence described above.

Preferably, when the remote server 550 receives a message it re-encodes it in several formats and stores in memory data files created for each such format. When the called fax machine transmits the DIS, the remote server sends the appropriate format and erases the others. The benefit of this method is that transmission time is reduced because the file is already encoded before transmission to the fax machine.

A further aspect of the invention is that the service maintains a registry of fax machines that have installed the interface of this invention. The interface may register such fax machines automatically once the interface has been properly coupled to the fax machine. The remote server computer stores this information and may use standard search-and-sort software to determine whether the interface has been installed for a given destination fax machine. The service, in general, has a capability to determine, on the basis of the data stored therein, the capability of the intended recipient of the file and, according to the determined capability of the recipient, send the file in a suitable format.

Figure 6:
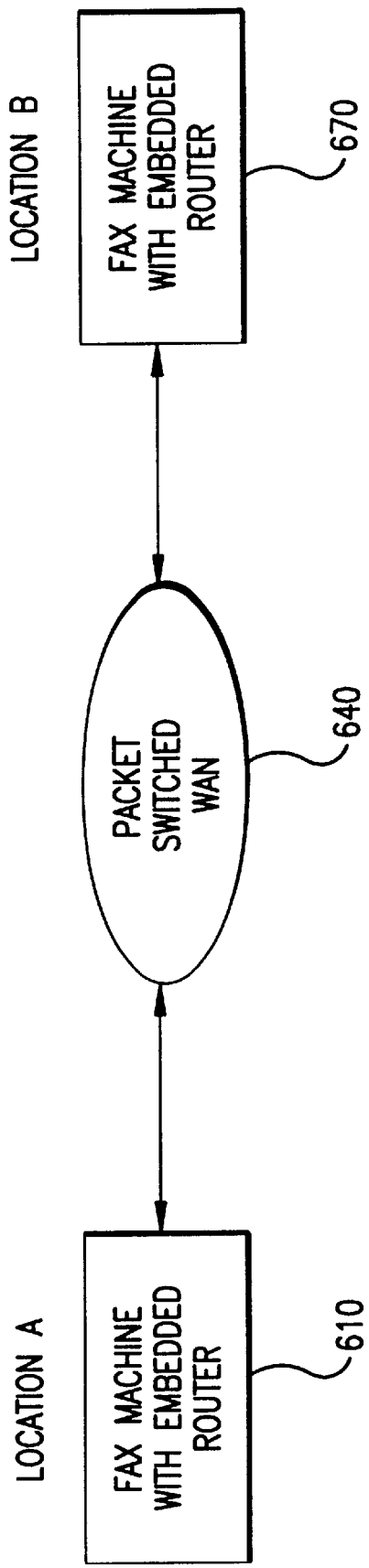
FIG. 6 is a schematic illustration of a fax communication system where the routing function is embedded in the fax machines.

FIG. 6 shows another alternative embodiment of the invention. Here, the routing function is performed by the interface that is embedded in the sending fax machine. In this embodiment, each fax machine 610 and 670 performs the functions of the first and second interfaces as previously described. However, the sending fax machine with embedded interface 610 routes the message directly over a computer network 640 to the destination or receiving fax machine with the associated interface 670.

If the routing function is embedded in the interface, it will function as described above except that it will not provide a connection to a local server which is responsible for a routing over a computer network to a remote server. Rather, the interface establishes a connection to a desired receiving interface directly over the network. Accordingly, the message will be packetized at the interface level. Otherwise the message is demodulated, decompressed, re-compressed and transferred to the receiving interface as described above. Also as described above, at the receiving interface, the message is demodulated, decompressed, recompressed and re-modulated in standard fax format and transferred to the receiving fax machine.

FIG. 7 illustrates yet another preferred embodiment of the present invention. The elements of FIG. 7, which are similar to those of FIG. 1, bear the same reference numbers increased by 600. In this embodiment, the first (sending) interface apparatus 720 is interfaced to a computer packet switched network (WAN or Internet) 740 via network access point 725. The access point 725 is, for example, a typical Internet access server available through an internet provider such as AT&T. As illustrated, the configuration of this embodiment does not employ a local server at the sending side of the fax communication system. This embodiment utilizes a Central Server/Traffic Control system 745 which stores correlations between destination telephone numbers and corresponding network addresses of the local servers associated with the destination telephone numbers.

More specifically, the operation of this embodiment of FIG. 7 is as follows. The fax machine 710 establishes communication with the interface 720 as described above, see e.g. FIG. 8 and related discussion. The purpose and functionality of the interface 720 is also as described above with respect to the functions such as modulation, compression, and encryption of facsimile messages. In addition, the sending interface 720 formats the message for transmission over a computer packet switched network, such as WAN or Internet. Thus, the interface 720 performs necessary packetizing, addressing and any other processing for communication over a packet switched network.

After the interface 720 obtains the destination telephone number from the fax machine 710, it formats a query message for the central server/traffic control computer 745. The message is first received by the access point 725, which routes it to the central server 745 via the packet switched network. The interface provides the telephone number of the destination fax machine as part of this message. In response, the central server searches its data base, which contains a correlation of the local servers and telephone numbers, using known searching techniques. When the local server has been identified, the central server returns a message identifying the address of the appropriate destination local server 750 to the sending interface apparatus 720. Thereafter, the interface apparatus 720 addresses the packetized message generated for the file representing the received facsimile transmission to the address of the local server that was provided by the central server. This message is then transmitted to the network access point 725 which sends it over the packet switched network to the receiving local server 750. From this point the server transmits information to the fax machine 770 through the receiving interface 760 in the same manner as described above.

An aspect of the system of the invention is that it is able to send a confirmation or acknowledgment message back to the originating (transmitting) fax machine 110,510,610,710 of FIGS. 1, 5, 6, and 7 respectively. Alternatively, in the event that the confirmation message is not sent, the system generates an appropriate error message. Either the interface at the called station or the remote server may send an appropriate message to the transmitting fax machine using the voice network directly or in accordance with the above method.

As indicated, in one preferred embodiment of the invention, the local server formats a packetized message for a packet-switched network. The packetized message in this form is sent to the second server, where it is depacketized and sent to the second interface which in turn reconverts it to a fax message. Numerous variations of this may be practiced within the spirit and scope of the invention. For example, the fax message may be packetized at the first interface instead of the first server (see, e.g., embodiment of FIG. 7 and accompanying discussions) and/or depacketized at the second interface instead of the second server. And communication between the interface and the server at either end of the system may be over analog lines instead of digital lines albeit at slower speeds. In general, various means of communication can be employed, for example, in certain embodiments an ATM network can be used. Further, in certain embodiments the steps of compression and decompression may be omitted. In such embodiment the file representing a facsimile is included in a message formatted for transmission over a packet switched network without modifying the compression of data. In such embodiments, at the receiving end, there is no need to re-compress the file for sending the file to the fax machine.

As mentioned, the present invention is equally applicable to a configuration where a sending and/or receiving fax machine is replaced by a computer with a fax modem. Also, it is within the skill in the art to configure the interface of this invention so that it stores faxes up to a given memory limit until the fax may be sent to the attached PC with a fax modem or a fax machine.

In addition, it is within the skill in the art to configure the system of this invention to provide a remote character recognition service. There are various known character recognition techniques that can be used. In this configuration, the receiving interface incorporates a character recognition system which processes a file and converts it to a desired format, for example, for use by a word processor. Alternatively, the character recognition capability can be provided at the receiving server.

Yet another modification within the skill in the art is to store information that can be added to incoming faxes in the receiving interface. For example, if a newsletter is faxed to a given destination every month, the receiving fax machine can pre-store the cover page or corporate logo of the sender and then add it to each faxed newsletter.

Since various changes may be made in carrying out the method and the apparatus set forth without departing from the spirit and scope of the invention, it is intended that all matter contained in the above description and shown in the accompanying drawings shall be interpreted as illustrative and not in a limiting sense. It is also to be understood that the following claims are intended to cover all of the generic and specific features herein described and all statements of the scope of the invention which, as a matter of language, might be said to fall therebetween.

What is claimed is:

1. A communication apparatus for use in connection with a facsimile machine comprising:

means for establishing a telephone communication between the facsimile machine and the communication apparatus without routing a signal through a Central Office telephone switch;

a receiving means for receiving from the facsimile machine a modulated compressed facsimile communication;

a demodulating means for demodulating said modulated compressed communication to produce a demodulated compressed output;

a decompressing means for decompressing the demodulated compressed output to produce a decompressed output;

a compressing means for compressing the decompressed output to produce a re-compressed output; and a transmitting means for transmitting, without a command from a user requesting such a transmission, the re-compressed output to a destination.

2. The communication apparatus of claim 1 further comprising:
- a second receiving means for receiving the re-compressed output from the transmitting means;
- a second decompressing means for decompressing the received re-compressed output to produce a received decompressed output;
- a second compressing means for compressing the received decompressed output to produce a received re-compressed output;
- a second modulating means for modulating the re-compressed output to produce a received re-compressed modulated output; and
- a second transmitting means for transmitting the received re-compressed modulated output to a device for receiving facsimile transmission.

3. The communication apparatus of claim 2 further comprising a means of packetizing the re-compressed output for transmission over a packet switched network, and the second receiving means of claim 2 comprises a means for receiving a packetized output from a packet switched network.

4. The communication apparatus of claim 2 wherein the apparatus further comprises an encrypting means for encrypting the decompressed output and a means of decrypting the re-compressed output.

5. The communication apparatus of claim 2 wherein the apparatus provides two-way full-duplex transmission of the modulated output.

6. The communication apparatus of claim 1 further comprising an encrypting means for encrypting the demodulated decompressed output.

7. The communication apparatus of claim 1 wherein the apparatus is attached to a communications output of the facsimile machine.

8. The communication apparatus of claim 1 wherein the destination is a local server.

9. The communication apparatus of claim 1 wherein said means for receiving a facsimile communication comprises a facsimile modem and the transmitting means comprises a data modem.

10. The communication apparatus of claim 9 further comprising a data storage means for storing the facsimile communication, said means having a predefined storage threshold, wherein the data modem goes off-hook, establishes a live connection and dials the number of a local server when the data stored at the data storage means is at the storage threshold.

11. The communication apparatus of claim 10 wherein the lossless compression routine is JBIG.

12. The communication apparatus of claim 1 wherein the means for compressing the decompressed output utilizes a lossless compression routine.

13. The communication apparatus of claim 1 further comprising a means of routing the compressed output to a receiving facsimile machine using a network.

14. The communication apparatus of claim 1 wherein is a facsimile machine and the apparatus is attached to a communications output of the facsimile machine.

15. The communication apparatus of claim 1 wherein the apparatus is incorporated within the facsimile machine.

16. A method of transmitting a facsimile communication from a sending facsimile machine to a device for receiving facsimile transmission comprising the steps of:
- establishing a telephone communication between the sending facsimile machine and a first communication apparatus without routing a signal through a Central Office telephone switch;
- receiving by the first communication apparatus a modulated compressed communication from the sending facsimile machine;
- demodulating said modulated compressed communication to produce a demodulated compressed output;
- decompressing the demodulated compressed output to produce a demodulated decompressed output;
- re-compressing the demodulated decompressed output to produce a compressed output; and
- transmitting, without a command from a user requesting such a transmission, the compressed output for delivery of the facsimile communication to the device for receiving facsimile transmission.

17. The method of claim 16 wherein the step of transmitting the compressed output comprises the steps of:
- transmitting the compressed output to a predetermined local server;
- transmitting the compressed output from the local server to a remote server over a wide-area network; and
- transmitting the compressed output from the remote server to a second communication apparatus.

18. The method of claim 17 wherein the local server packetizes the compressed output for transmission over a packet switched network.

19. The method of claim 17 further comprising performing by the second communication apparatus the steps of:
- receiving the compressed output transmitted by the remote server;
- decompressing the compressed output to produce a decompressed output;
- compressing the decompressed output to produce a second compressed output;
- modulating the second compressed output to produce a facsimile communication; and
- transmitting the facsimile communication to the device for receiving facsimile transmission.

20. The method of claim 17 further comprising the steps of:
- decompressing the compressed output;
- re-compressing the compressed output in standard facsimile format;
- modulating the re-compressed output for transmission over a circuit switched telephone network; and
- transmitting the modulated re-compressed output to the receiving facsimile machine in standard facsimile format.

21. The method of claim 16 further comprising the step of packetizing the compressed output for transmission over a packet switched network.

22. the method of claim 16 wherein the step of establishing telephone communication further comprises:
- receiving at the first communications apparatus an off-hook signal from the sending facsimile machine;
- generating by the first communications apparatus a signal recognizable by the sending facsimile machine as a dial tone.

23. A method of transmitting documents to remote locations comprising:
- establishing a telephone communication between a sending facsimile machine and a first communication apparatus without routing a signal through a Central Office telephone switch;

receiving by the first communication apparatus a facsimile transmission of an image file of a document encoded in a first data format from the sending facsimile machine;

converting the image file from the first data format to a second data format for digital transmission of the file as a data file over a computer network;

determining routing information for transmitting the file to a remote location over the network;

transmitting, without receiving a command from a user requesting such a transmission, the data file over the network to the remote location; and generating at the remote location a paper copy of the document on the basis of the image file.

24. The method of claim 23 wherein the network is the Internet.

25. The method of claim 23 wherein the generating step further comprises converting the image file from the second data format to the first data format for generating paper documents.

26. A method of receiving documents from remote locations comprising:

receiving from a called party over a packet switched computer network an image file representing a document;

converting the file from a data format compatible with network communication of digital data to a different data format compatible with communication with a fax modem;

establishing a telephone communication with a receiving facsimile machine without routing a signal through a Central Office telephone switch;

transmitting the file to a fax modem of the receiving facsimile machine.

27. A method of transmitting documents to remote locations using a computer associated with a calling party comprising:

establishing a telephone communication between a transmitting facsimile machine and the computer without routing a signal through a Central Office telephone switch;

receiving at the computer from the transmitting facsimile machine, data representing a facsimile of a document;

storing the data representing the facsimile of a document at the computer as an image file;

converting the image file to a data file having a different data format; and transmitting the data file over a network to the remote location;

wherein the steps of converting and transmitting are performed without a command from a user to perform such conversion and transmission.

28. The method of claim 27 wherein the network is the Internet.

29. A method of providing a document for character recognition at a remote location comprising:

establishing a telephone communication between a transmitting facsimile machine and a first computer without routing a signal through a Central Office telephone switch;

receiving data representing a facsimile of a document at the first computer from the transmitting facsimile machine;

storing the data representing the facsimile of a document at the first computer as an image file;

converting the image file to a data file having a different data format; and transmitting the data file over a network to a second computer at the remote location having a character recognition capability;

wherein the steps of converting and transmitting are performed without a command from a user to perform such conversion and transmission.

30. A communication apparatus for use in connection with a facsimile machine comprising:

a receiving means for receiving from the facsimile machine a modulated facsimile communication;

a demodulating means for demodulating said modulated communication to produce a demodulated output;

encrypting means for encrypting the demodulated output;

a formatting means for formatting the demodulated encrypted output to produce a formatted output; and a transmitting means for transmitting the formatted output to a destination;

wherein the transmitting step is performed automatically, without a command from a user to perform such a transmission.

31. The communication apparatus of claim 30 further comprising:

a second receiving means for receiving a formatted output from the transmitting means as a received message;

means for decrypting the received message to produce the decrypted message;

a modulating means for modulating the decrypted message to produce a received decrypted modulated output; and a second transmitting means for transmitting the received decrypted modulated output to a device for receiving facsimile transmission.

32. The communication apparatus of claim 30 further comprising a decompressing means for decompressing the demodulated output to produce a demodulated decompressed output.

33. The communication apparatus of claim 30 further comprising a means of routing the formatted output directly to a receiving facsimile machine using a network.

34. The communication apparatus of claim 30 wherein the transmitting means comprises a means of packetizing the formatted output for transmission over a packet switched network.

35. A method of transmitting a facsimile communication from a first location to a second location comprising the steps of:

receiving at the first location a modulated communication from a first facsimile machine for transmission to a second location;

demodulating said modulated communication to produce a demodulated compressed output;

encrypting the demodulated output to produce a demodulated encrypted output;

formatting the encrypted demodulated output to produce a first signal; and transmitting the first signal to deliver the facsimile communication to the second location;

wherein the transmitting step is performed without a command from a user to perform such a transmission.

36. The method of claim 35 wherein the step of transmitting the first signal comprises the steps of:

forming a telecommunications connection with a local server;

transmitting the first signal to the local server;

establishing a communication connection between said local server and a remote server over a wide-area network, said remote server being local to said second location;

transmitting the first signal from the local server to the remote server over the wide-area network; and transmitting the first signal from the remote server to the second location.

37. The method of claim 36 wherein the local server packetizes the signal for transmission over a packet switched network.

38. The method of claim 36 further comprising performing at the second location the steps of:

receiving the first signal transmitted from the remote server to the second location;

decrypting the first signal to produce a decrypted output;

modulating the decrypted output to produce a second signal; and transmitting the second signal to a second communication device.

39. The method of claim 35 further comprising the step of packetizing the signal for transmission over a packet switched network.

40. A method of transmitting a facsimile communication from a first location to a second location comprising the steps of:

receiving at a first location modulated communication from a first facsimile machine for transmission to the second location;

demodulating said modulated communication to produce a demodulated output;

formatting the demodulated output to produce formatted data;

packetizing the formatted data for transmission over a packet switched computer network; and transmitting the packetized formatted data to the second location;

wherein the transmitting step is performed without a command from a user to perform such a transmission.

41. The method of claim 40 wherein the step of transmitting the packetized formatted data toward the second location further comprises the step of transmitting the packetized formatted data to a network access point.

42. The method of claim 41 wherein the step of transmitting the packetized formatted data further comprises transmitting the packetized formatted data from the network access point to a remote server over a wide-area network.

43. The method of claim 40 wherein the data received at the first location includes a destination telephone number.

44. The method of claim 43 further includes the step of transmitting the destination telephone number to a central server.

45. The method of claim 44 further comprising searching a data base at the central server for an address of a remote server corresponding to the destination telephone number.

46. A method of transmitting documents to remote locations comprising:

receiving at a first communication apparatus a facsimile transmission of an image file of a document encoded in a first data format from a sending facsimile machine, wherein the first communication apparatus is interfaced directly to a packet switched network;

converting the image file from the first data format to a second data format for digital transmission of the file as a packetized data file over a packet switched network, wherein the step of converting includes packetizing data representing the image file;

formatting and sending a message from the first communication apparatus to a central server wherein said message includes data that identify the remote location and that cause the central server to determine an address of a destination local server; and addressing and sending the packetized data file representing the received facsimile transmission to the local server at the address provided by the central server.

47. A method of transmitting documents to remote locations comprising:

receiving at a first communication apparatus a facsimile transmission of an image file of a document encoded in a first data format from a sending facsimile machine;

converting the image file from the first data format to a second data format for digital transmission of the file as a data file over a computer network;

transmitting the data file to a local server;

transmitting the data file from the local server to a remote server;

determining at the remote server whether a destination facsimile machine is interfaced to an apparatus for accepting data communication; and if the destination facsimile machine is not interfaced to an apparatus for receiving data communication, converting at the remote server the data file into a format compatible with the destination facsimile machine.

48. A method of transmitting documents to remote locations comprising:

receiving at a first communication apparatus a facsimile transmission of an image file of a document encoded in a first data format from a sending facsimile machine;

converting the image file from the first data format to a second data format for digital transmission of the file as a data file over a computer network;

transmitting, without receiving a command from a user requesting such a transmission, the data file over the network to a remote location;

determining at the remote location whether the transmission was successful; and transmitting from the remote location to the first communication apparatus an acknowledgement indicating whether the transmission was successful.

49. A communication apparatus for use in connection with a facsimile machine comprising:

a receiving means for receiving from the facsimile machine a modulated compressed facsimile communication, wherein the receiving means comprises a timer which measures the time that the receiving means receives the communication;

a demodulating means for demodulating said modulated compressed communication to produce a demodulated compressed output;

a decompressing means for decompressing the demodulated compressed output to produce a decompressed output;

a compressing means for compressing the decompressed output to produce a re-compressed output; and a transmitting means for transmitting, without a command from a user requesting such a transmission, the re-compressed output to a destination.

* * * * *